(12) United States Patent
Yang

(10) Patent No.: US 8,412,233 B2
(45) Date of Patent: Apr. 2, 2013

(54) METHOD, LOCATION SERVICE APPARATUS AND SYSTEM FOR ACQUIRING A CELL POSITION AND LOCATING A CELL

(75) Inventor: Kui Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 28 days.

(21) Appl. No.: 13/257,952

(22) PCT Filed: Oct. 19, 2009

(86) PCT No.: PCT/CN2009/074511
§ 371 (c)(1),
(2), (4) Date: Nov. 18, 2011

(87) PCT Pub. No.: WO2010/139153
PCT Pub. Date: Dec. 9, 2010

(65) Prior Publication Data
US 2012/0077487 A1 Mar. 29, 2012

(30) Foreign Application Priority Data
Jun. 1, 2009 (CN) .......................... 2009 1 0085807

(51) Int. Cl.
*H04W 24/00* (2009.01)
(52) U.S. Cl. ............... 455/456.1; 455/404.2; 455/432.1; 455/414.2; 455/435.1; 701/1; 701/400; 701/408; 701/409
(58) Field of Classification Search ............... 455/404.2, 455/414.2, 432.1–432.2, 433, 435.1, 456.1–456.6, 455/457; 701/1, 400, 408, 409
See application file for complete search history.

(56) References Cited

U.S. PATENT DOCUMENTS

| | | | |
|---|---|---|---|
| 2006/0258369 A1 | 11/2006 | Burroughs | |
| 2007/0026871 A1* | 2/2007 | Wager | 455/456.1 |
| 2007/0096981 A1 | 5/2007 | Abraham | |
| 2009/0047979 A1* | 2/2009 | Oh et al. | 455/457 |
| 2010/0231448 A1* | 9/2010 | Harper | 342/357.67 |
| 2011/0319095 A1 | 12/2011 | Burroughs | |

FOREIGN PATENT DOCUMENTS

| | | |
|---|---|---|
| CN | 1602102 A | 3/2005 |
| KR | 20040103721 A | 12/2004 |

(Continued)

OTHER PUBLICATIONS

Enhanced Support for Roaming and Privacy of Location services Sep. 4, 2001.

(Continued)

*Primary Examiner* — Wayne Cai
(74) *Attorney, Agent, or Firm* — Oppedahl Patent Law Firm LLC

(57) ABSTRACT

The present invention provides a method, location service apparatus and system for acquiring a cell position, relating to the field of mobile communications. The method comprises the following steps that: a location service apparatus receives, from a first terminal, a locating request including an identifier of the cell where the first terminal resides, determines whether the cell position information corresponding to the identifier of the cell is stored in a base station database of the location service apparatus and generates a result of determining and, in the case where the result of determining is that the cell position information corresponding to the identifier of the cell is stored in the base station database of the location service apparatus, sends a first locating request to the first terminal, receives first position information from the first terminal, wherein the first position information is the position information returned after the first terminal carries out a location according to the first locating request, and stores the first position information as the cell position information corresponding to the identifier of the cell. The present invention can be applied to locate a cell where a roaming terminal resides.

36 Claims, 9 Drawing Sheets

FOREIGN PATENT DOCUMENTS

WO 2008147258 A1 12/2008

OTHER PUBLICATIONS

Supplementary European Search Report in European application No. 09845433.3 mailed on Oct. 1, 2012.

International Search Report on international application No. PCT/CN2009/074511, mailed on Mar. 18, 2010.

English Translation of the Written Opinion of the International Search Authority in international application No. PCT/CN2009/074511, mailed on Mar. 18, 2010.

* cited by examiner

METHOD, LOCATION SERVICE APPARATUS AND SYSTEM FOR ACQUIRING A CELL POSITION AND LOCATING A CELL

TECHNICAL FIELD

The present invention relates to the field of mobile communications, and more particularly to a method, location service apparatus and system for acquiring a cell position and locating a cell.

BACKGROUND

Location Based Services (LBS), known as mobile location services or location services, enable a mobile network to acquire the geographical position information (that is, latitude and longitude coordinates) of a mobile terminal using a specific locating technology, provide the acquired geographical position information to a mobile terminal user, a communication system or a third party, and provide, with the support from certain electronic map information, the mobile terminal user with calls or non-call services related to the position of the mobile terminal user.

The location manners of a mobile communication network comprise a cell-based location, a location based on conventional Global Positioning System (GPS) and an Assisted GPS (AGPS) location, wherein the AGPS location is a location technology which combines the GPS location with a mobile communication system and has been widely applied owing to its quick positioning speed and high positioning accuracy.

Currently, in the Secure User Plane Location (SUPL) protocol of Open Mobile Alliance (OMA), the location flow initiated by a terminal comprises the following steps:

step 1: an AGPS location application program on the terminal is connected with a location services apparatus of the AGPS via a packet data domain to send an SUPL START message to request a location;

step 2: the location services apparatus searches, via the cell identifier (CELL ID) information included in the SUPL START message, a base station database (used for storing a cell identifier and the cell position information corresponding to the cell identifier) for the position information of the cell where the terminal resides so as to acquire the current rough position of the terminal, calculates assistance data with the rough position in combination with its own GPS reference information, and sends the calculated assistance data to the terminal; and step 3: the terminal captures a GPS satellite signal according to the received GPS assistance information and carries out a location quickly. The specific location method may be understood by reference to an Open Mobile Alliance-Technology Specification-User Plane Location Protocol (OMA-TS-ULP).

A cell-based location flow comprises the following steps:

step 1: a location Service Provider (SP) sends a locating request to a location service apparatus to request it to locate a terminal;

step 2: after receiving the request, the location service apparatus sends a locating request to a Home Location Register (HLR), and the HLR returns the cell information of the terminal;

step 3: after receiving the cell information of the terminal, the location service apparatus searches a base station database for the position of the cell where the terminal resides; and step 4: the location service apparatus sends the position of the cell where the terminal resides to the service provider.

The location flows above both need to search a base station database for the position of the cell where a terminal currently resides, however, it is a hard task for the base station database to acquire the position information of all the cells of the worldwide mobile networks and update the information timely and accurately. Acquiring a correct cell position is impossible when a terminal is in a roaming state (meaning that the position information of the cell where the terminal resides cannot be found in the base station database) and the base station database stores no information of the base station where the terminal is roaming, leading to a failed location. Therefore, it is impossible to locate the cell where a roaming terminal resides.

SUMMARY

The technical problem the present invention aims to solve is to provide a method, location service apparatus and system for acquiring a cell position, which are capable of locating a cell where a roaming terminal resides.

In order to solve the technical problem, the following technical solutions are provided in embodiments of the present invention.

In one aspect of the present invention, a method for acquiring a cell position is provided, comprising:

a location service apparatus receives, from a first terminal, a locating request including an identifier of the cell where the first terminal resides;

the location service apparatus determines whether cell position information corresponding to the identifier of the cell is stored in a base station database of the location service apparatus and generates a result of determining;

in the case where the cell position information corresponding to the identifier of the cell is not stored in the base station database of the location service apparatus, the location service apparatus sends a first locating request to the first terminal;

the location service apparatus receives first position information from the first terminal, wherein the first position information is the position information returned after the first terminal carries out a location according to the first locating request; and the location service apparatus stores the first position information as the cell position information corresponding to the identifier of the cell, so as to acquire the position information of the cell where a roaming terminal resides.

In the method for acquiring a cell position, the step that the location service apparatus sends a first locating request to the first terminal may comprise: the location service apparatus sends the first terminal a first locating request including a GPS satellite almanac; and the first position information may refer to the position information generated after the first terminal carries out a GPS location according to the GPS satellite almanac.

The method for acquiring a cell position may further comprise:

the location service apparatus sends a second locating request to a second terminal residing in the same cell with the first terminal;

the location service apparatus receives second position information from the second terminal, wherein the second position information is the position information returned after the second terminal carries out a location according to the second locating request;

the location service apparatus generates third position information according to the first position information and the second position information; and the location service apparatus updates the cell position information with the third position information.

In the method for acquiring a cell position, the method may further comprise: the location service apparatus calculates GPS assistance information according to the first position information before the location service apparatus sends the second locating request to the second terminal;

specifically, the step that the location service apparatus sends a second locating request to the second terminal may be as follows: the location service apparatus sends the second terminal a second locating request including the GPS assistance information;

wherein the second position information may refer to the position information generated after the second terminal carries out a GPS location according to the GPS assistance information.

In the method for acquiring a cell position, the first position information and the second position information may be longitude and latitude coordinates; and specifically, the step that the location service apparatus generates third position information according to the first position information and the second position information may be as follows:

the location service apparatus generates the third position information by calculating the average value of the first position information and the second position information; or the location service apparatus generates the third position information according to the occurrence probability of the first position information and the second position information.

The method for acquiring a cell position may further comprise:

the location service apparatus receives a locating request including an identifier of a first cell to be searched from a first cell position information requesting apparatus;

the location service apparatus compares the identifier of the first cell to be searched with that of the cell where the first terminal resides; and in the case where the identifiers of the first cell to be searched and the cell where the first terminal resides are the same, the location service apparatus sends the cell position information to the first cell position information requesting apparatus, so as to acquire the position information of the cell to be searched.

The present invention further provides a location service apparatus, comprising:

a first receiving unit configured to receive, from a first terminal, a locating request including an identifier of the cell where the first terminal resides;

a determining unit configured to determine whether the cell position information corresponding to the identifier of the cell is stored in a base station database of the location service apparatus and generate a result of determining;

a first sending unit configured to send a first locating request by the location service apparatus to the first terminal in the case where the cell position information corresponding to the identifier of the cell is not stored in the base station database of the location service apparatus;

a second receiving unit configured to receive first position information from the first terminal, wherein the first position information is the position information returned after the first terminal carries out a location according to the first locating request; and a storage unit configured to store the first position information as the cell position information corresponding to the identifier of the cell, so as to acquire the position information of the cell where a roaming terminal resides.

In the location service apparatus, the first sending unit may be further configured to send a second locating request, and the second terminal resides in the same cell with the first terminal;

the second receiving unit may be further configured to receive second position information from the second terminal, wherein the second position information is the position information returned after the second terminal carries out a location according to the second locating request;

the location service apparatus may further comprise:

a position information generation unit configured to generate third position information according to the first position information and the second position information; and an update unit configured to update the cell position information with the third position information.

The location service apparatus may further comprise:

a third receiving unit configured to receive a locating request including an identifier of a cell to be searched from a cell position information requesting apparatus;

a comparison unit configured to compare the identifier of the cell to be searched with that of the cell where the first terminal resides and generate a result of comparing; and a second sending unit configured to send the cell position information to the first cell position information requesting apparatus when the identifiers of the cell to be searched and the cell where the first terminal resides are the same.

In another aspect of the present invention, a system for acquiring cell position information is further provided, comprising a location service apparatus and a first terminal, wherein the first terminal is configured to send the location service apparatus a locating request including an identifier of the cell where the first terminal resides; and the location service apparatus is configured to receive, from the first terminal, the locating request including the identifier of the cell where the first terminal resides, determine whether cell position information corresponding to the identifier of the cell is stored in a base station database of the location service apparatus and generate a result of determining and, in the case where the result of determining is that the cell position information corresponding to the identifier of the cell is not stored in the base station database of the location service apparatus, send a first locating request to the first terminal, receive, from the first terminal, first position information which is the position information returned after the first terminal carries out a location according to the first locating request, and store the first position information as the cell position information corresponding to the identifier of the cell, so as to acquire the position information of the cell where a roaming terminal resides.

In the system for acquiring cell position information, the first locating request may include a GPS satellite almanac; and the first position information may refer to the position information returned after the first terminal carries out a GPS location according to the GPS satellite almanac.

The system for acquiring cell position information may further comprise:

a second terminal, which is configured in the cell where the first terminal resides and configured to receive a second locating request sent by the location service apparatus, carry out a location according to the second locating request, and send the generated second position information to the location service apparatus; and the location service apparatus may be further configured to generate third position information according to the first position information and the second position information, and update the position information of the cell with the third position information.

In the system for acquiring cell position information, the location service apparatus may be further configured to calculate, after receiving the first position information from the first terminal, GPS assistance information according to the first position information and include the calculated GPS assistance information in the second locating request to be sent to the second terminal; and the second terminal may be further configured to carry out a GPS location according to the GPS assistance information.

In the system for acquiring cell position information, the first position information and the second position information may be latitude and longitude coordinates; and the location service apparatus may be further configured to generate third position information by calculating the average value of the first position information and the second position information or generate third position information according to the occurrence probability of the first position information and the second position information.

The system for acquiring cell position information may further comprise a first cell position information requesting apparatus, wherein the first cell position information requesting apparatus is configured to send the location service apparatus a locating request including an identifier of a first cell to be searched; and the location service apparatus may be further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

The embodiments of the present invention have the following benefic effect:

in this solution, as the location service apparatus receives, from the first terminal, the identifier of the cell where the first terminal resides and the first position information of the cell where the first terminal resides, and stores the first position information as the cell position information corresponding to the identifier of the cell, in the subsequent flows, if another terminal is roaming in the cell where the first terminal resides, then the cell position information of the roaming terminal can be acquired by searching for the cell position information corresponding to the identifier of the cell.

DETAILED DESCRIPTION

For the sake of a better understanding of the technical problem to be solved by the embodiments of the present invention as well as the technical solutions and the advantages of the present invention, the present invention is described below in detail by reference to the accompanying drawings in conjunction with specific embodiments.

In order to solve the problem that a cell where a roaming terminal resides cannot be located in the prior art, embodiments of the present invention provides a method, location service apparatus and system for acquiring a cell position and locating a cell.

Figure 1:
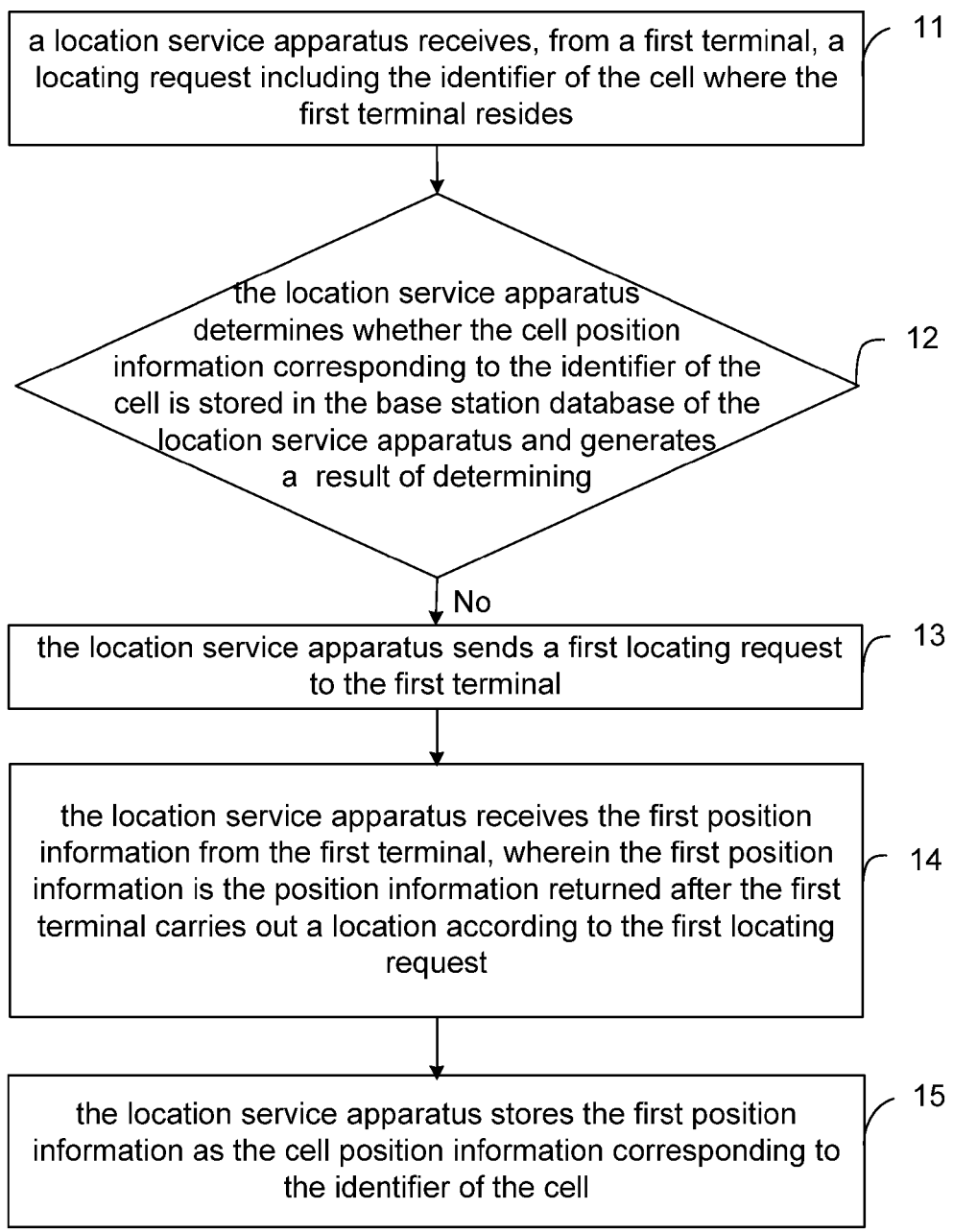
FIG. 1 is a flow chart of a method for acquiring a cell position according to an embodiment of the present invention.

FIG. 1 shows an embodiment of a method for acquiring a cell position disclosed in the present invention, as shown in FIG. 1, the method comprises the following steps:

step 11: a location service apparatus receives, from a first terminal, a locating request including an identifier of the cell where the first terminal resides, thereby receiving the identifier of the cell where the first terminal resides from the first terminal; specifically, this step is as follows: the location service apparatus receives, from the first terminal, a locating request message including the identifier of the cell where the first terminal resides, and acquires the identifier of the cell from the locating request message;

step 12: the location service apparatus determines whether the cell position information corresponding to the identifier of the cell is stored in the base station database of the location service apparatus and generates a result of determining, this step aiming at determining whether the first terminal is in a roaming state;

step 13: in the case where the cell position information corresponding to the identifier of the cell is not stored in the base station database of the location service apparatus, the location service apparatus sends a first locating request to the first terminal to cause the first terminal to carry out a GPS location and generate first position information, it is clear that the location service apparatus is capable of confirming the location capability of the terminal, receiving information of terminal location capability from the terminal, and sending a locating request to the first terminal if the first terminal has a location function; and the first terminal carries out a location using its own GPS chip and generates the first position information;

step 14: the location service apparatus receives the first position information from the first terminal, wherein the first position information is the position information returned after the first terminal carries out a location according to the first locating request;

step 15: the location service apparatus stores the first position information as the cell position information corresponding to the identifier of the cell.

It should be understood by those skilled in the art that the location service apparatus can locally store the first position information as the cell position information corresponding to the identifier of the cell or send the first position information and the identifier of the cell to a roamed region position collecting device and store the first position information and the identifier of the cell in the roamed region position collecting device.

In this solution, the location service apparatus receives, from the first terminal, the identifier of the cell where the first terminal resides and the first position information of the cell where the first terminal resides, and stores the first position information as the cell position information corresponding to the identifier of the cell, therefore, in the subsequent flows, if another roaming terminal is located in the cell where the first terminal resides, then the cell position information of the roaming terminal can be acquired by searching for the cell position information corresponding to the identifier of the cell.

Figure 2:
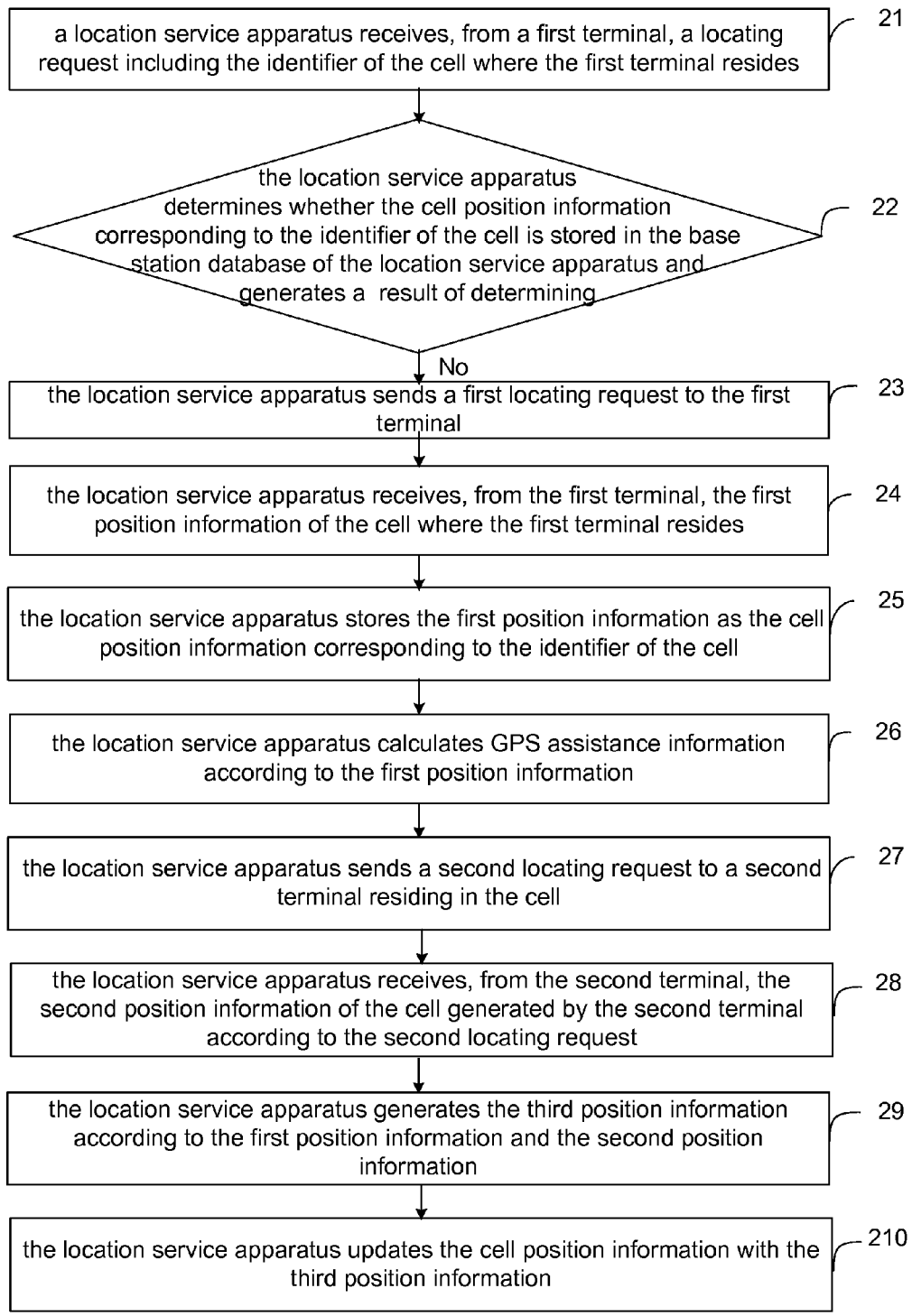
FIG. 2 is a flow chart of a method for acquiring a cell position according to another embodiment of the present invention.

FIG. 2 shows the flow of a method for acquiring a cell position disclosed in another embodiment of the present invention, as shown in FIG. 2, the method comprises the following steps:

step 21: a location service apparatus receives, from a first terminal, a locating request including the identifier of the cell where the first terminal resides; specifically, this step is as follows: the location service apparatus receives, from a first terminal, a locating request message including the identifier of the cell where the first terminal resides, and acquires the identifier of the cell from the locating request message;

step 22: the location service apparatus determines whether the cell position information corresponding to the identifier of the cell is stored in the base station database of the location service apparatus and generates a result of determining; specifically, this step is as follows: the location service apparatus searches the base station database for the position information corresponding to the identifier of the cell, if the result of the determining shows that the cell position information corresponding to the identifier of the cell is not stored in the base station database of the location service apparatus (that is, the position information of the cell where the first terminal resides is not stored in the base station database), then it is indicated that the first terminal is in a roaming state and the first terminal needs to be located by itself; and if the result of the determining shows that the cell position information corresponding to the identifier of the cell is stored in the base station database of the location service apparatus, the position information of the cell where the first terminal resides is acquired from the base station database and sent to the first terminal, then the flow is ended;

step 23: in the case where the cell position information corresponding to the identifier of the cell is not stored in the base station database of the location service apparatus, the location service apparatus sends a first locating request to the first terminal to cause the first terminal to carry out a GPS location and generate first position information; specifically, this step is as follows: the location service apparatus sends the first terminal a first locating request including a GPS satellite almanac to cause the first terminal to carry out a GPS location according to the GPS satellite almanac and generate first position information, thereby shortening the time taken on the location by the first terminal;

step 24: the location service apparatus receives, from the first terminal, the first position information of the cell where the first terminal resides, wherein the first position information is the position information returned after the first terminal carries out a location according to the first locating request; specifically, this step is as follows: the location service apparatus receives, from the first terminal, the first position information generated after the first terminal carries out a GPS location according to the GPS satellite almanac;

step 25: the location service apparatus stores the first position information as the cell position information corresponding to the identifier of the cell;

as in the steps above the information of the position where the first terminal resides is taken as the position information of the cell where the first terminal resides, the stored cell position information is slightly deviated from the actual cell position information; in order to minimize the error between the stored cell position information corresponding to the identifier of the cell and the actual cell position, the present invention further comprises the following steps:

step 26: the location service apparatus calculates GPS assistance information according to the first position information;

step 27: the location service apparatus sends a second locating request to a second terminal residing in the cell to cause the second terminal to carry out a GPS location and generate second position information, specifically, the step 27 is as follows: if the second terminal resides in the same cell where the first terminal resides, the location service apparatus sends the second terminal a second locating request including the GPS assistance information to cause the second terminal to carry out a GPS location according to the GPS assistance information and generate the second position information, and the second terminal captures a GPS satellite signal according to the received GPS assistance information and carries out a location quickly, thereby shortening the time taken on the location by the terminal; wherein the content of the GPS assistance information and the specific location method can be understood by reference to the OMA-TS-ULP;

step 28: the location service apparatus receives, from the second terminal, the second position information of the cell generated by the second terminal according to the second locating request; specifically, the step 28 is as follows: the location service apparatus receives, from the second terminal, the second position information generated after the second terminal carries out a GPS location according to the GPS assistance information;

step 29: the location service apparatus generates third position information according to the first position information and the second position information; the first position information and the second position information may be longitude and latitude coordinates; specifically, step 29 is as follows: the location service apparatus generates third position information by calculating the average value of the first position information and the second position information or generates third position information according to the occurrence probability of the first position information and the second position information; it should be understood by those skilled in the art that the algorithm for generating the third position information may be other algorithms, and the more times the location on the terminals in the same cell is performed, the closer the obtained cell position information is to the actual cell position information;

step 210: the location service apparatus updates the cell position information with the third position information.

Figure 3:
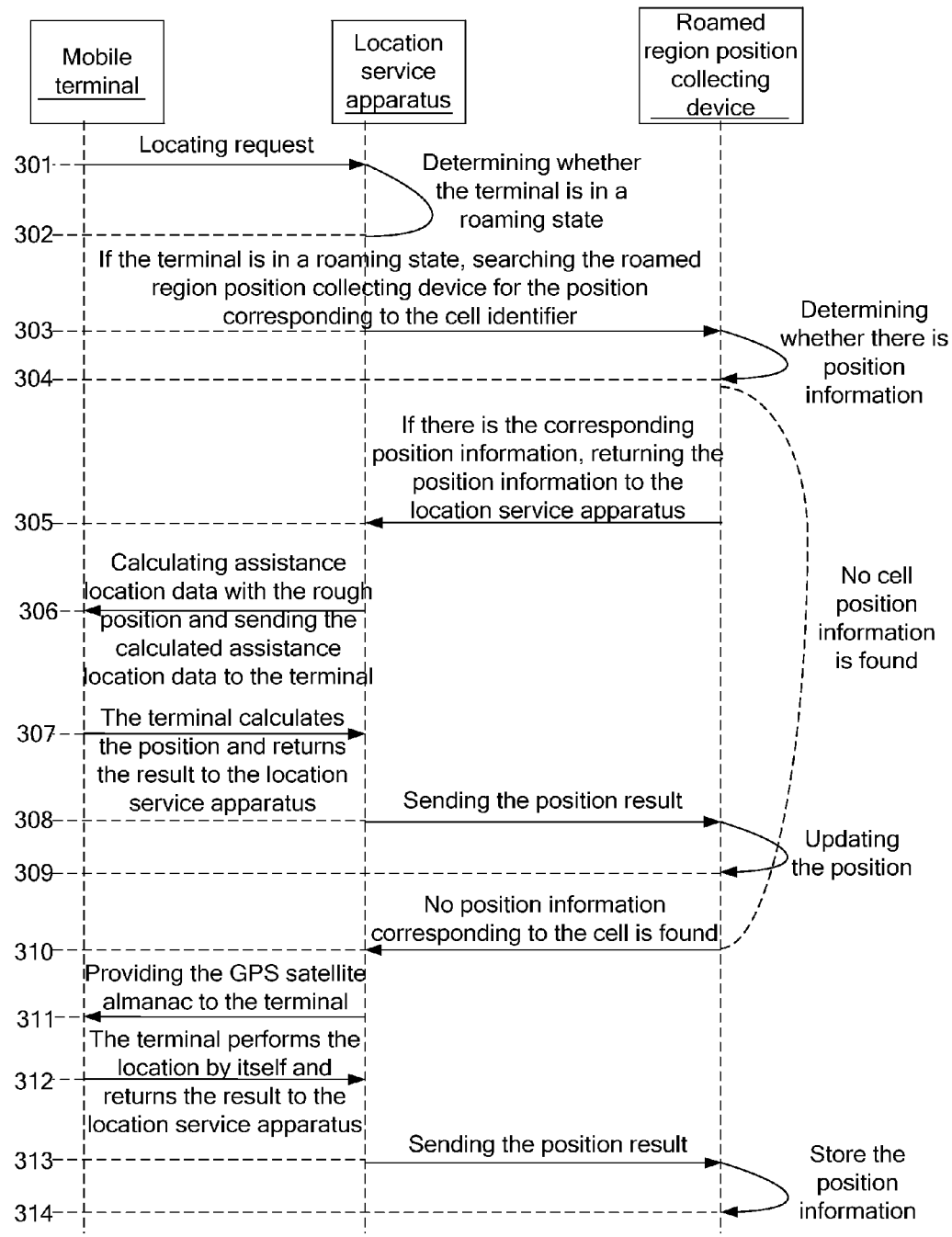
FIG. 3 is a flow chart illustrating the method for acquiring a cell position disclosed in the present invention which is applied to the scenario of an AGPS location.

FIG. 3 shows the scenario of the location service method disclosed in the present invention applied to an AGPS location, in this application scenario, the location service apparatus sends the first position information and the identifier of the cell to the roamed region position collecting device and stores the first position information and the identifier of the cell in the roamed region position collecting device. The method comprises the following steps:

step 301: a terminal user initiates a locating request including the identifier information of the cell (CELL) where the terminal resides to a location service apparatus;

step 302: the location service apparatus searches the base station database for the position information corresponding to the cell according to the cell identifier information of the terminal and, in the case where a position result is found, calculates the GPS assistance data information needed by the terminal according to the position result, and sends the calculated GPS assistance data information to the terminal to interact with the terminal, then the terminal completes the location and step 307 is executed; or in the case where no position result is found, step 303 is executed;

step 303: the location service apparatus sends a message to cause the roamed region position collecting device to search for position result corresponding to the cell and then step 304 is executed;

step 304: the roamed region position collecting device searches for the position result corresponding to the identifier information of the cell, step 305 is executed if the position result is found, otherwise, step 310 is executed;

step 305: the roamed region position collecting device returns the position result to the location service apparatus and then step 306 is executed;

step 306: the location service apparatus calculates the GPS assistance location information needed by the terminal according to the position result returned by the roamed region position collecting device, sends the calculated GPS assistance location information to the terminal to exchange messages with the terminal, and then step 307 is executed;

step 307: after calculating the position result, the terminal returns the position result to the location service apparatus and then step 308 is executed;

step 308: location service apparatus sends the location result to the roamed region position collecting device and then step 309 is executed;

step 309: after receiving the new position result, the roamed region position collecting device updates the position result corresponding to the cell by updating the algorithm;

step 310: if finding no position information corresponding to the cell, the roamed region position collecting device returns an error indication message to the location service apparatus and then step 311 is executed;

step 311: after receiving the error indication message from the roamed region position collecting device, the location service apparatus sends the GPS satellite almanac to the terminal to accelerate the location on the terminal and then step 312 is executed;

step 312: after receiving the GPS satellite almanac message from the location service apparatus, the terminal determines the position result, sends the position result to the location service apparatus, and then step 313 is executed;

step 313: after receiving the position result, the location service apparatus sends the position result and corresponding cell identifier information to a roamed region position collecting device;

step 314: after receiving the position result, the roamed region position collecting device stores the position result corresponding to the cell.

Figure 4:
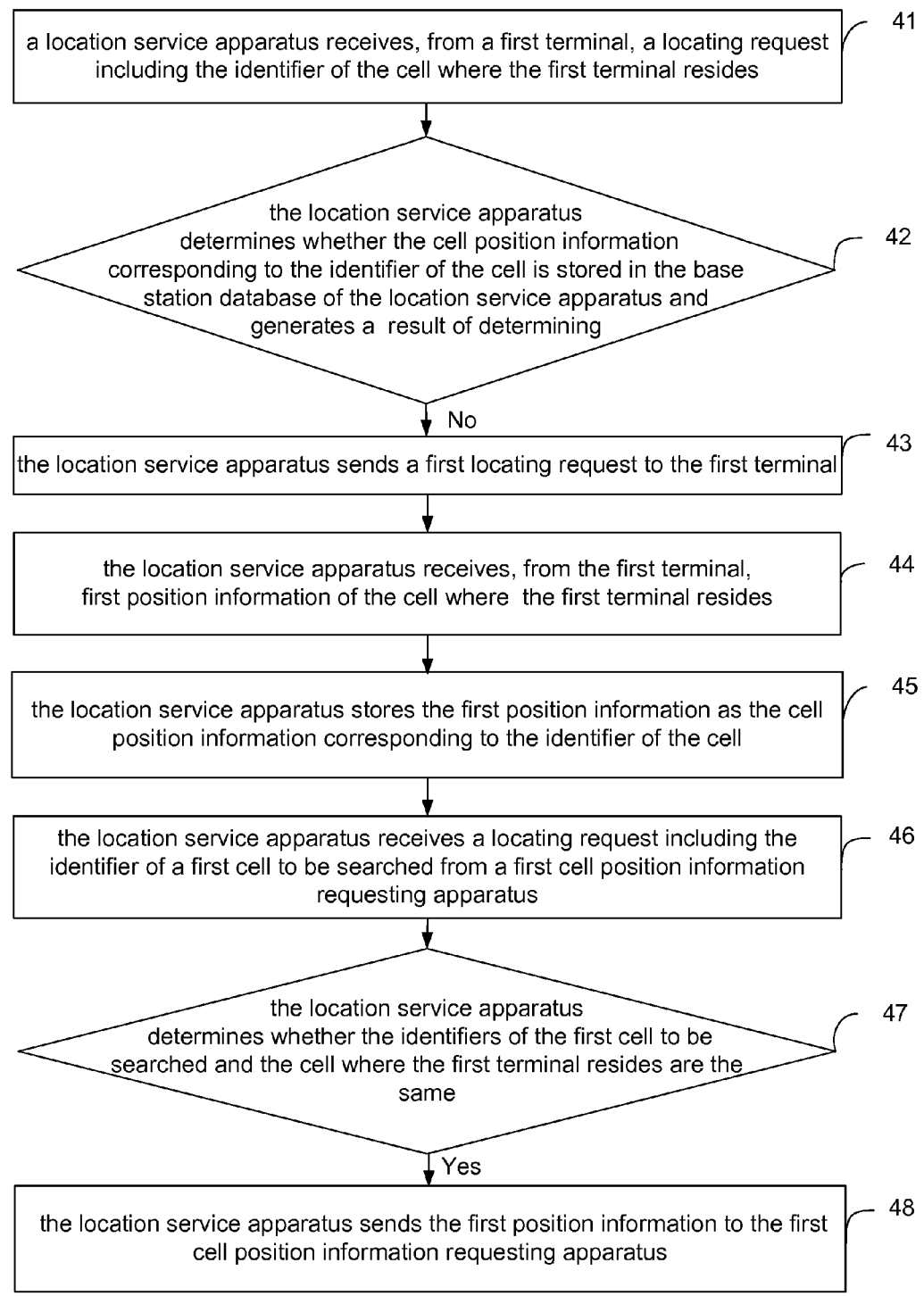
FIG. 4 is a flow chart of a method for locating a cell according to an embodiment of the present invention.
Figure 5:
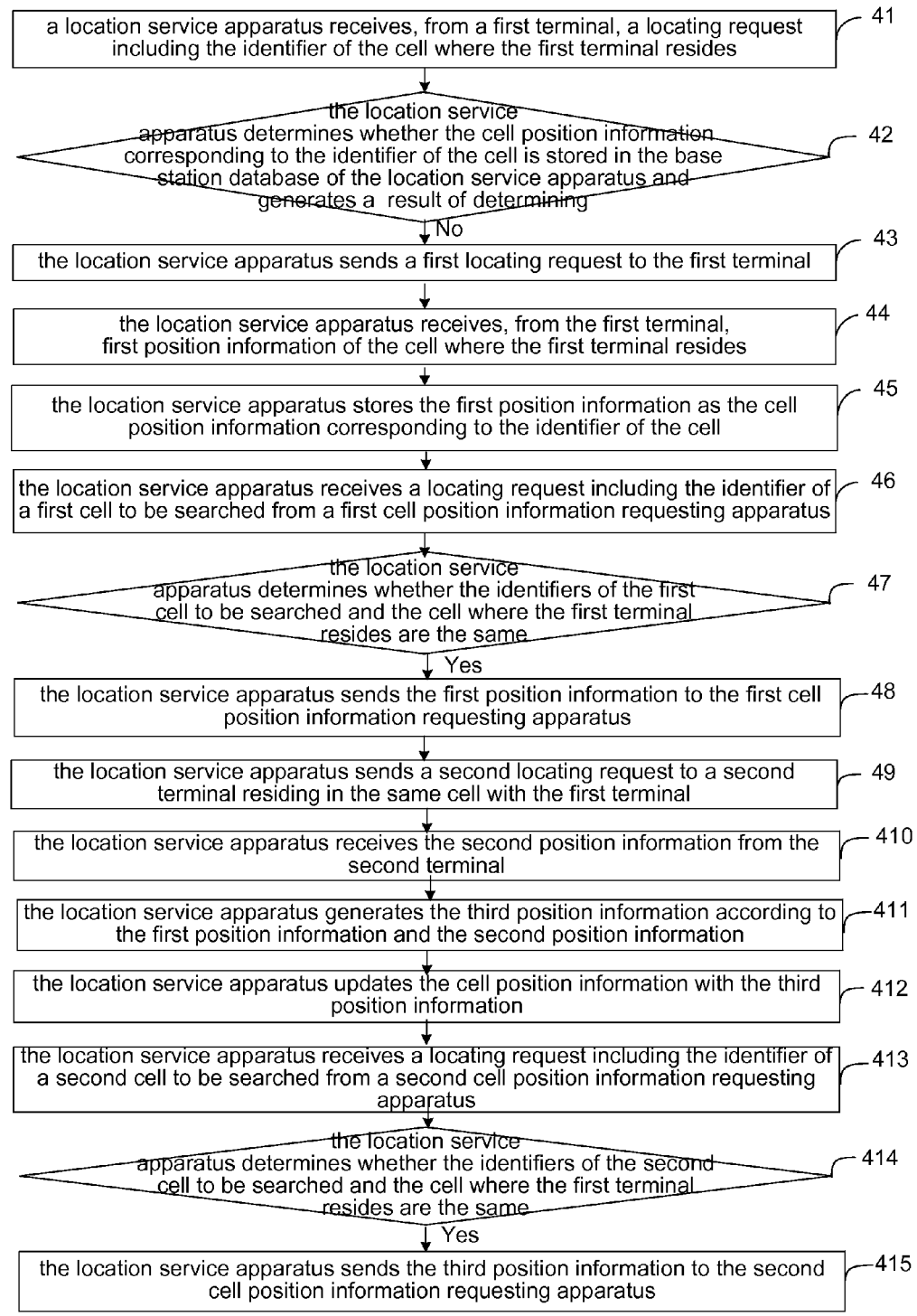
FIG. 5 is a flow chart of a method for locating a cell according to another embodiment of the present invention.

FIG. 4 shows an embodiment of a method for locating a cell disclosed in the present invention, as shown in FIG. 4, the method comprises the following steps:

step 41: a location service apparatus receives, from a first terminal, a locating request including the identifier of the cell where the first terminal resides;

step 42: the location service apparatus determines whether the cell position information corresponding to the identifier of the cell is stored in the base station database of the location service apparatus and generates a result of determining;

step 43: the location service apparatus sends a first locating request to the first terminal if the cell position information corresponding to the identifier of the cell is not stored in the base station database of the location service apparatus;

step 44: the location service apparatus receives first position information from the first terminal, wherein the first position information is the position information returned after the first terminal carries out a location according to the first locating request;

step 45: the location service apparatus stores the first position information as the cell position information corresponding to the identifier of the cell;

step 46: the location service apparatus receives a locating request including the identifier of a first cell to be searched from a first cell position information requesting apparatus;

step 47: the location service apparatus compares the identifier of the first cell to be searched with that of the cell where the first terminal resides; and step 48: the location service apparatus sends the first position information to the first cell position information requesting apparatus if the identifiers of the first cell to be searched and the cell where the first terminal resides are the same;

in this solution, as the location service apparatus receives, from the first terminal, the identifier of the cell where the first terminal resides and the first position information of the cell where the first terminal resides, and stores the first position information as the cell position information corresponding to the identifier of the cell; in the case where the cell to be searched is the cell where the first terminal resides, the position information of the cell to be searched can be acquired by searching for the cell position information corresponding to the cell identifier;

in the present invention, the information of position where the first terminal resides is taken as the position information of the cell where the first terminal resides, therefore, in order to minimize the error between the stored cell position information corresponding to the identifier of the cell and the actual cell position, in another embodiment shown in FIG. 5, the method for locating a cell further comprises the following steps:

step 49: the location service apparatus sends a second locating request to a second terminal residing in the same cell with the first terminal;

step 410: the location service apparatus receives the second position information from the second terminal, wherein the second position information is the position information generated after the second terminal carries out a location according to the second locating request;

step 411: the location service apparatus generates third position information according to the first position information and the second position information;

step 412: the location service apparatus updates the cell position information with the third position information;

step 413: the location service apparatus receives a locating request including the identifier of a second cell to be searched from a second cell position information requesting apparatus;

step 414: the location service apparatus compares the identifier of the second cell to be searched with that of the cell where the first terminal resides; and step 415: the location service apparatus sends the third position information to the second cell position information requesting apparatus if the identifiers of the second cell to be searched and the cell where the first terminal resides are the same.

Figure 6:
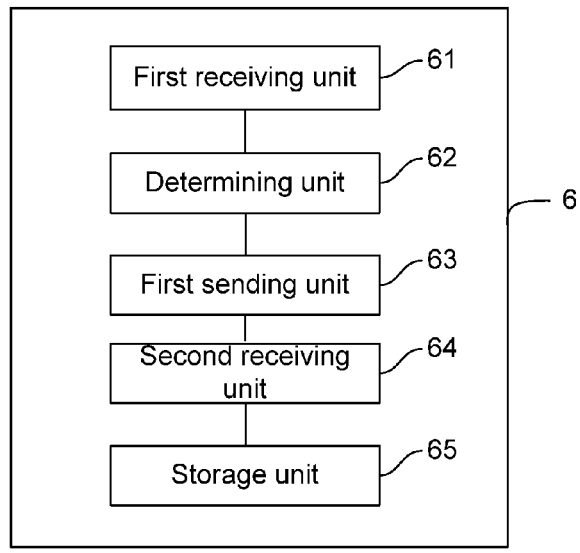
FIG. 6 is a schematic diagram illustrating the structure of a location service apparatus according to an embodiment of the present invention.

FIG. 6 shows a location service apparatus 6 of the present invention, comprising:

a first receiving unit 61 configured to receive, from a first terminal, a locating request including the identifier of the cell where the first terminal resides;

a determining unit 62 configured to determine whether the cell position information corresponding to the identifier of the cell is stored in the base station database of the location service apparatus and generate a result of determining;

a first sending unit 63 configured to send a first locating request by the location service apparatus to the first terminal in the case where the cell position information corresponding to the identifier of the cell is not stored in the base station database of the location service apparatus;

a second receiving unit 64 configured to receive the first position information from the first terminal, wherein the first position information is the position information returned after the first terminal carries out a location according to the first locating request; and a storage unit 65 configured to store the first position information as the cell position information corresponding to the identifier of the cell.

In this solution, the first receiving unit 61 receives, from the first terminal, the identifier of the cell where the first terminal resides; the second receiving unit 64 receives, from the first terminal, the first position information of the cell where the first terminal resides; and the storage unit 65 stores the first position information as the cell position information corresponding to the identifier of the cell. In the subsequent flows, if a terminal is in a roaming state, that is, the cell position information to be searched is not stored in the base station database, then the position information of the cell where the roaming terminal resides can be acquired by searching for the stored cell identifier and cell information corresponding to the identifier of the cell.

Figure 7:
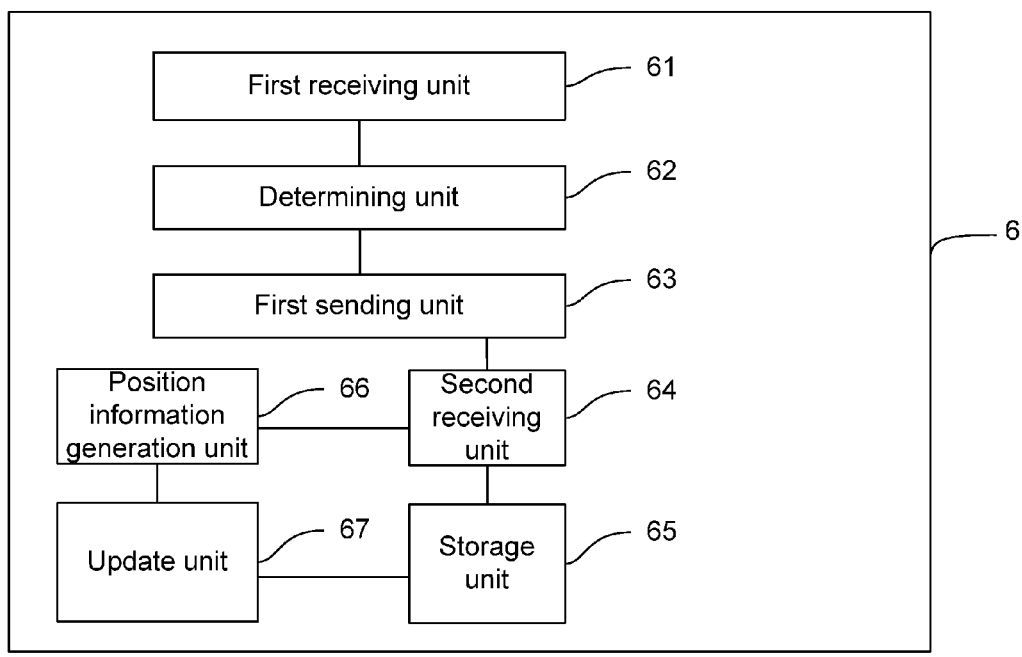
FIG. 7 is a schematic diagram illustrating the structure of a location service apparatus according to another embodiment of the present invention.

In the present invention, the information of the position where the first terminal resides is taken as the position information of the cell where the first terminal resides, therefore, in order to minimize the error between the stored cell position information corresponding to the identifier of the cell and the actual cell position, as shown in FIG. 7, the first sending unit 63 is further configured to send a second locating request, the second terminal is located in the same cell with the first terminal, and the second receiving unit 64 is further configured to receive second position information from the second terminal, wherein the second position information is the position information generated after the second terminal carries out a location according to the second locating request.

The location service apparatus 6 further comprises:

a position information generation unit 66 configured to generate third position information according to the first position information and the second position information; and an update unit 67 configured to update the cell position information with the third position information.

In this way, after the location on the second terminal residing in the same cell with the first terminal is completed, the location service apparatus can generate the third position information according to the first position information and the cell position information, and update the cell position information corresponding to the identifier of the cell with the third position information, and consequently, the more times the location on the terminals in the same cell is performed, the closer the obtained cell position information is to the actual cell position information, and the closer the cell position information acquired by searching the location service apparatus is to the actual cell position information.

Figure 8:
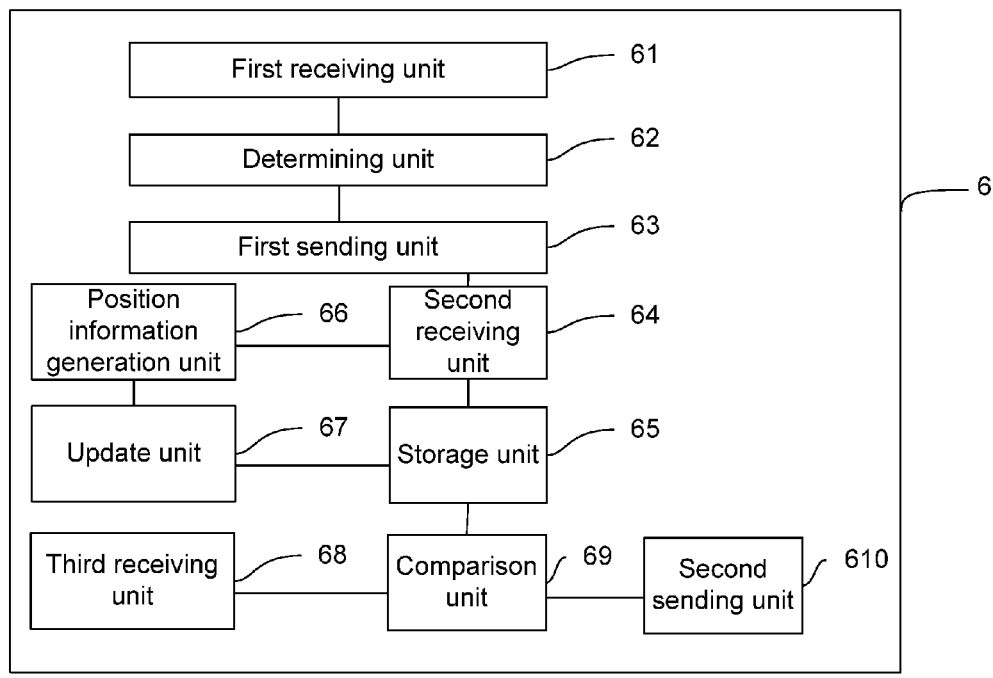
FIG. 8 is a schematic diagram illustrating the structure of a location service apparatus according to still another embodiment of the present invention.

As shown in FIG. 8, the location service apparatus 6 further comprises:

a third receiving unit 68 configured to receive a locating request including the identifier of a cell to be searched from a cell position information requesting apparatus;

a comparison unit 69 configured to compare the identifier of the cell to be searched with that of the cell where the first terminal resides and generate a result of comparing; and a second sending unit 610 configured to send the cell position information to the first cell position information requesting apparatus if the identifiers of the cell to be searched and the cell where the first terminal resides are the same.

Then, if the cell to be searched is the cell where the first terminal resides, then the position information of the cell to be searched can be acquired by searching for the cell position information corresponding to the cell identifier.

Figure 9:
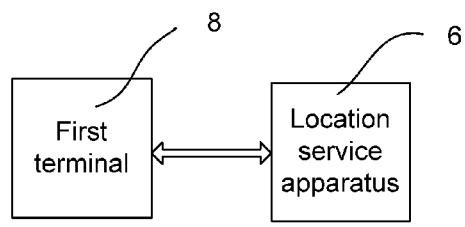
FIG. 9 is a schematic diagram illustrating the structure of a system for acquiring cell position information according to an embodiment of the present invention.

FIG. 9 shows a system for acquiring cell position information disclosed in the present invention, as shown in FIG. 9, the system comprises a location service apparatus 6 and a first terminal 8, wherein the first terminal 8 is configured to send the location service apparatus 6 a locating request including the identifier of the cell where the first terminal resides; and the location service apparatus 6 is configured to receive, from the first terminal, the locating request including the identifier of the cell where the first terminal resides, determine whether the cell position information corresponding to the identifier of the cell is stored in the base station database of the location service apparatus 6 and generate a result of determining, and, in the case where the result of determining is that the cell position information corresponding to the identifier of the cell is not stored in the base station database of the location service apparatus, send a first locating request to the first terminal, receive, from the first terminal, first position information which is the position information returned after the first terminal carries out a location according to the first locating request, and store the first position information as the cell position information corresponding to the identifier of the cell.

In this solution, the first terminal 8 sends the location service apparatus 6 the identifier of the cell where the first terminal resides and the first position information of the cell where the first terminal resides, so that the location service apparatus 6 can store the first position information as the cell position information corresponding to the identifier of the cell. In the subsequent flows, if a terminal is in a roaming state, that is, the cell position information to be searched is not stored in the base station database, then the position information of the cell where the roaming terminal resides can be acquired by searching for the identifier of the cell and cell information corresponding to the identifier of the cell which are stored by the location service apparatus 6.

Figure 10:
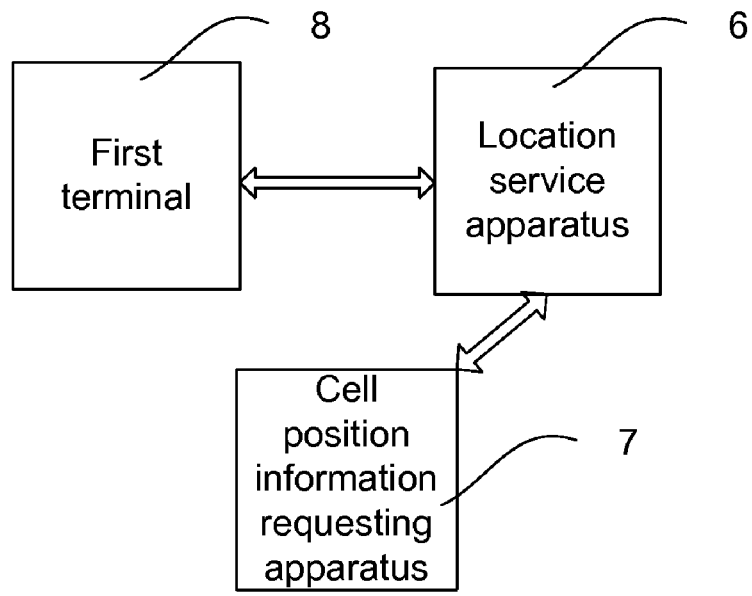
FIG. 10 is a schematic diagram illustrating the structure of a system for acquiring cell position information according to another embodiment of the present invention.

As shown in FIG. 10, the system for acquiring cell position information further comprises a cell position information requesting apparatus 7 configured to send a locating request including the identifier of a cell to be searched to the location service apparatus 6; and the location service apparatus 6 is further configured to compare the identifier of the cell to be searched with that of the cell where the first terminal resides, and send the cell position information to the cell position information requesting apparatus 7 if the result of the comparing shows that the identifiers of the cell to be searched and the cell where the first terminal resides are the same.

Figure 11:
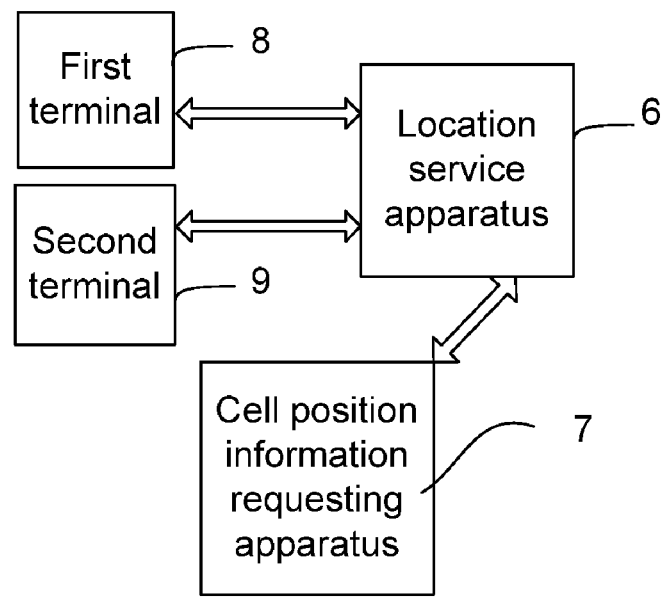
FIG. 11 is a schematic diagram illustrating the structure of a system for acquiring cell position information according to still another embodiment of the present invention.

FIG. 11 shows another embodiment of the system for acquiring cell position information, as shown in FIG. 11, the system further comprises a second terminal 9.

The second terminal 9 is configured to send, if the second terminal resides in the cell, second position information to the location service apparatus 6; and the location service apparatus 6 is further configured to generate third position information according to the first position information and the second position information, and update the cell position information with the third position information. The more times the location on the terminals in the same cell is performed, the closer the obtained cell position information is to the actual cell position information, and accordingly, the closer the cell position information acquired by searching the location service apparatus 6 is to the actual cell position information.

Figure 12:
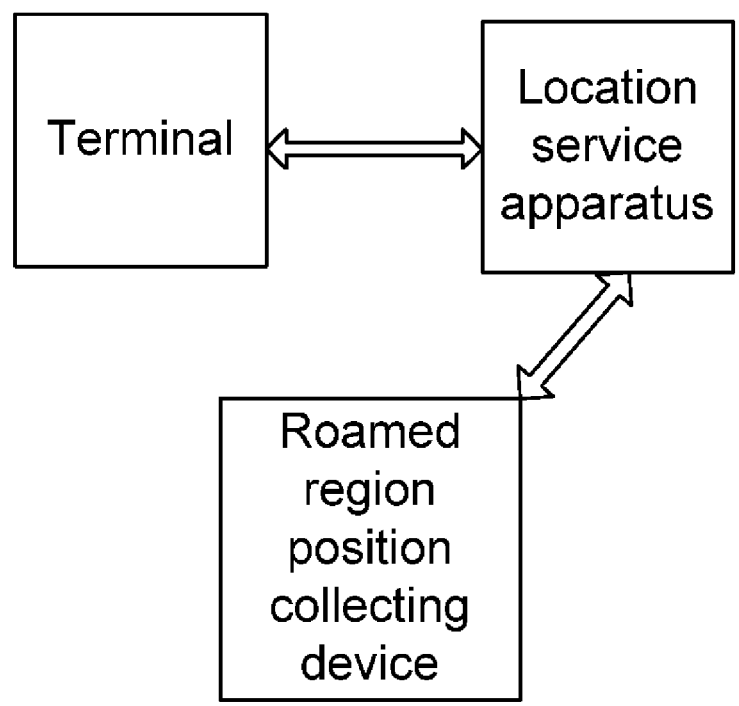
FIG. 12 is a schematic diagram illustrating the structure of an application scenario of the system for acquiring cell position information disclosed in the present invention.

Below is description of an application scenario of the system for acquiring cell position information disclosed in the present invention. As shown in FIG. 12, the system for acquiring cell position information comprises a terminal, a location service apparatus and a roamed region position collecting device, wherein in this application scenario, the location service apparatus sends the first position information and the identifier of the cell to the roamed region position collecting device, and the first position information and the identifier of the cell are stored in the roamed region position collecting device.

Wherein the terminal takes charge of the information exchange with the location service apparatus and, in the case where the location mode is an AGPS location, carries out a location using its own AGPS chip to generate a location result, and sends the location result to the location service apparatus.

The location service apparatus is capable of providing location services, including authenticating the privacy of a locating request message, confirming the location capability of a locating terminal, and receiving and processing a locating request from a location Service Provider (SP).

The roamed region position collecting device, which enables the location service apparatus to search for the position of the cell in a roamed region and has a function of updating cell position information and a self-learning function, is capable of storing or updating the cell position and cell identifier which are returned by the location service apparatus using a self-learning algorithm to guarantee the accuracy of the position of the cell in the roamed region. The location service apparatus collects the cell position information of the networks of the worldwide mobile communication operators through a self-learning method to realize an AGPS location or a cell location when a terminal is in a roaming state.

Below is description of the interaction between the roamed region position collecting device and the location service apparatus, comprising:

step 1: in a location process, after receiving a locating request message for a terminal, the location service apparatus searches a base station database according to the cell identifier information carried by the terminal in the case where the AGPS location mode is adopted, or, in the case where the location is a cell location initiated by a location service provider, the location service apparatus sends a message to an HLR to search for the cell identifier information of the terminal to be located, then searches the base station database via the cell identifier information, and if no cell position information is found, that is, the terminal is roaming in a region outside the service range of the location service apparatus, step 2 is executed;

step 2: the location service apparatus searches the roamed region position collecting device for the position information corresponding to the cell identifier information, if the position information corresponding to the cell identifier information is found, the obtained position result is returned to the location service apparatus, and then step 3 is executed, or if no position information corresponding to the cell identifier information is found, a failure result is returned to the location service apparatus and then step 4 is executed;

step 3: after receiving the position result, the location service apparatus calculates, in the case where AGPS location mode is adopted, GPS assistance information according to the position result, sends the calculated GPS assistance information to the terminal and interacts with the terminal, the terminal completes the location; the locating terminal returns the position result to the location service apparatus; the location service apparatus sends the position result to the roamed region position collecting device; and the roamed region position collecting device updates the position information corresponding to the cell through a given algorithm, wherein the update on the cell position result by the roamed region position collecting device is not a simple update on the position result but an update using a given algorithm, the more position results on the same cell are collected, the more accurate the obtained cell position result is, that is, the more times the location on terminals is performed, the closer the obtained position result is to the actual cell position; in the case where the location is a cell location, the location service apparatus directly returns the position result to the location service provider, then the location flow is ended;

step 4: if receiving no position information corresponding to the cell where the terminal currently resides, the location service apparatus sends, in the case where an AGPS location mode is adopted, a GPS satellite almanac to the terminal, the terminal carries out a location using its own GPS chip and generates a position result, and sends the position result to the location service apparatus, the location service apparatus sends the position result to the roamed region position collecting device, and the roamed region position collecting device stores the position result corresponding to the cell; or, in the case where a cell location mode is adopted, the location service apparatus returns failure information to the location service provider.

The present invention is applied when a terminal to be located is roaming in a region outside the service range of the location service apparatus to provide an AGPS location service and a cell location service with the aid of the roamed region position collecting device. The roamed region position collecting device may be configured in the location service apparatus. The first terminal may be a mobile telephone and the like. The location carried out by the terminal may be a GPS location or other kinds of locations. The cell position information requesting apparatus may be a location service provider or a terminal and the like.

The embodiments of the method are corresponding to those of the apparatus, therefore, those are not described in detail in the embodiments of the method can be understood by reference to the counterparts described in detail in the embodiments of the apparatus, and those are not described in detail in the embodiments of the apparatus can be understood by reference to the counterparts described in detail in the embodiments of the method.

It should be appreciated by those of the ordinary skilled in the art that all or part of the steps described in the embodiments of the method can be completed by related hardware run by a program, the program may be stored in a computer-readable storage medium, when the program is running, the steps described in the embodiments of the method as well as the storage medium such as magnetic disc, optical disc, Read-Only Memory (ROM) or Random Access Memory (RAM) are involved.

The sequence numbers of the steps are not to be construed as limiting the execution order of the steps in the embodiments of the method of the present invention, it also should be appreciated by those of the ordinary skilled in the art that the modification devised in the order of the steps without making creative work also belongs to the scope of the protection of the present invention.

The mentioned above are only preferred embodiments of the present invention, it should be noted that various modification and improvements can be devised by those of the ordinary skilled in the art without departing from the principles of the present invention, and that all the devised modifications and improvements shall belong to the scope of the protection of the present invention.

Industrial Applicability

The present invention is applied when a terminal to be located is roaming in a region outside the service range of the location service apparatus to provide an AGPS location service and a cell location service with the aid of the roamed region position collecting device. The roamed region position collecting device may be configured in the location service apparatus. The first terminal may be a mobile telephone and the like. The location carried out by the terminal may be a GPS location or other kinds of locations. The cell position information requesting apparatus may be a location service provider or a terminal and the like.

The invention claimed is:

1. A method for acquiring a cell position, comprising:
    a location service apparatus receiving, from a first terminal, a locating request including an identifier of the cell where the first terminal resides;
    the location service apparatus determining whether cell position information corresponding to the identifier of the cell is stored in a base station database of the location service apparatus and generating a result of determining;
    in the case where the cell position information corresponding to the identifier of the cell is not stored in the base station database of the location service apparatus, the location service apparatus sending a first locating request to the first terminal;
    the location service apparatus receiving first position information from the first terminal, wherein the first position information is the position information returned after the first terminal carries out a location according to the first locating request; and
    the location service apparatus storing the first position information as the cell position information corresponding to the identifier of the cell, so as to acquire the position information of the cell where a roaming terminal resides.

2. The method according to claim 1, wherein
    the step that the location service apparatus sends a first locating request to the first terminal comprises: the location service apparatus sends the first terminal a first locating request including a GPS satellite almanac; and
    the step that the first terminal carries out a location according to the first locating request comprises: the first terminal carries out a GPS location according to the GPS satellite almanac.

3. The method according to claim 2, further comprising:
    the location service apparatus sending a second locating request to a second terminal residing in the same cell with the first terminal;
    the location service apparatus receiving second position information from the second terminal, wherein the second position information is the position information returned after the second terminal carries out a location according to the second locating request;
    the location service apparatus generating third position information according to the first position information and the second position information; and
    the location service apparatus updating the cell position information corresponding to the identifier of the cell with the third position information.

4. The method according to claim 3, the method further comprising: the location service apparatus calculating GPS assistance information according to the first position information before the location service apparatus sends the second locating request to the second terminal;
    wherein the step that the location service apparatus sends a second locating request to the second terminal is as follows: the location service apparatus sends the second terminal a second locating request including the GPS assistance information; and
    the second position information refers to the position information generated after the second terminal carries out a GPS location according to the GPS assistance information.

5. The method according to claim 4, further comprising:
    the location service apparatus receiving a locating request including an identifier of a first cell to be searched from a first cell position information requesting apparatus;
    the location service apparatus comparing the identifier of the first cell to be searched with that of the cell where the first terminal resides; and
    in the case where the identifiers of the first cell to be searched and the cell where the first terminal resides are the same, the location service apparatus sending the cell position information to the first cell position information requesting apparatus, so as to acquire the position information of the cell to be searched.

6. The method according to claim 3, wherein
    the first position information and the second position information are latitude and longitude coordinates; and
    the step that the location service apparatus generates third position information according to the first position information and the second position information is as follows:
    the location service apparatus generates the third position information by calculating the average value of the first position information and the second position information; or
    the location service apparatus generates the third position information according to the occurrence probability of the first position information and the second position information.

7. The method according to claim 6, further comprising:
    the location service apparatus receiving a locating request including an identifier of a first cell to be searched from a first cell position information requesting apparatus;

the location service apparatus comparing the identifier of the first cell to be searched with that of the cell where the first terminal resides; and in the case where the identifiers of the first cell to be searched and the cell where the first terminal resides are the same, the location service apparatus sending the cell position information to the first cell position information requesting apparatus, so as to acquire the position information of the cell to be searched.

8. The method according to claim 3, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

9. The method according to claim 2, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

10. The method according to claim 1, further comprising:
the location service apparatus sending a second locating request to a second terminal residing in the same cell with the first terminal;
the location service apparatus receiving second position information from the second terminal, wherein the second position information is the position information returned after the second terminal carries out a location according to the second locating request;
the location service apparatus generating third position information according to the first position information and the second position information; and
the location service apparatus updating the cell position information corresponding to the identifier of the cell with the third position information.

11. The method according to claim 10, the method further comprising: the location service apparatus calculating GPS assistance information according to the first position information before the location service apparatus sends the second locating request to the second terminal;
wherein the step that the location service apparatus sends a second locating request to the second terminal is as follows: the location service apparatus sends the second terminal a second locating request including the GPS assistance information; and
the second position information refers to the position information generated after the second terminal carries out a GPS location according to the GPS assistance information.

12. The method according to claim 11, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

13. The method according to claim 10, wherein
the first position information and the second position information are latitude and longitude coordinates; and
the step that the location service apparatus generates third position information according to the first position information and the second position information is as follows:
the location service apparatus generates the third position information by calculating the average value of the first position information and the second position information; or
the location service apparatus generates the third position information according to the occurrence probability of the first position information and the second position information.

14. The method according to claim 13, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

15. The method according to claim 10, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

16. The method according to claim 1, further comprising:
the location service apparatus receiving a locating request including an identifier of a first cell to be searched from a first cell position information requesting apparatus;
the location service apparatus comparing the identifier of the first cell to be searched with that of the cell where the first terminal resides; and
in the case where the identifiers of the first cell to be searched and the cell where the first terminal resides are the same, the location service apparatus sending the cell position information to the first cell position information requesting apparatus, so as to acquire the position information of the cell to be searched.

17. A location service apparatus, comprising:
   a first receiving unit configured to receive, from a first terminal, a locating request including an identifier of the cell where the first terminal resides;
   a determining unit configured to determine whether cell position information corresponding to the identifier of the cell is stored in a base station database of the location service apparatus and generate a result of determining;
   a first sending unit configured to send a first locating request to the first terminal in the case where the cell position information corresponding to the identifier of the cell is not stored in the base station database of the location service apparatus;
   a second receiving unit configured to receive first position information from the first terminal, wherein the first position information is the position information returned after the first terminal carries out a location according to the first locating request; and
   a storage unit configured to store the first position information as the cell position information corresponding to the identifier of the cell, so as to acquire the position information of the cell where a roaming terminal resides.

18. The location service apparatus according to claim 17, wherein
   the first sending unit is further configured to send a second locating request to a second terminal residing in the same cell with the first terminal;
   the second receiving unit is further configured to receive second position information from the second terminal, wherein the second position information is the position information returned after the second terminal carries out a location according to the second locating request;
   the location service apparatus further comprising:
   a position information generation unit configured to generate third position information according to the first position information and the second position information; and
   an update unit configured to update the cell position information with the third position information.

19. The location service apparatus according to claim 18, further comprising:
   a third receiving unit configured to receive a locating request including an identifier of a cell to be searched from a cell position information requesting apparatus;
   a comparison unit configured to compare the identifier of the cell to be searched with that of the cell where the first terminal resides and generate a result of comparing; and
   a second sending unit configured to send the cell position information to the first cell position information requesting apparatus when the identifiers of the cell to be searched and the cell where the first terminal resides are the same.

20. The location service apparatus according to claim 17, further comprising:
   a third receiving unit configured to receive a locating request including an identifier of a cell to be searched from a cell position information requesting apparatus;
   a comparison unit configured to compare the identifier of the cell to be searched with that of the cell where the first terminal resides and generate a result of comparing; and
   a second sending unit configured to send the cell position information to the first cell position information requesting apparatus when the identifiers of the cell to be searched and the cell where the first terminal resides are the same.

21. A system for acquiring cell position information, comprising: a location service apparatus and a first terminal, wherein
   the first terminal is configured to send the location service apparatus a locating request including an identifier of the cell where the first terminal resides; and
   the location service apparatus is configured to receive, from the first terminal, the locating request including the identifier of the cell where the first terminal resides, determine whether cell position information corresponding to the identifier of the cell is stored in a base station database of the location service apparatus and generate a result of determining and, in the case where the result of determining is that the cell position information corresponding to the identifier of the cell is not stored in the base station database of the location service apparatus, send a first locating request to the first terminal, receive, from the first terminal, first position information which is the position information returned after the first terminal carries out a location according to the first locating request, and store the first position information as the cell position information corresponding to the identifier of the cell, so as to acquire the position information of the cell where a roaming terminal resides.

22. The system according to claim 21, wherein
   the first locating request includes a GPS satellite almanac; and
   the first position information refers to the position information returned after the first terminal carries out a GPS location according to the GPS satellite almanac.

23. The system according to claim 22, further comprising:
   a second terminal, which is configured in the cell where the first terminal resides and configured to receive a second locating request sent by the location service apparatus, carry out a location according to the second locating request, and send the generated second position information to the location service apparatus; and
   the location service apparatus is further configured to generate third position information according to the first position information and the second position information, and update the position information of the cell with the third position information.

24. The system according to claim 23, wherein
   the location service apparatus is further configured to calculate, after receiving the first position information from the first terminal, GPS assistance information according to the first position information and include the calculated GPS assistance information in the second locating request to be sent to the second terminal; and
   the second terminal is further configured to carry out a GPS location according to the GPS assistance information.

25. The system according to claim 24, wherein
   the first position information and the second position information are latitude and longitude coordinates; and
   the location service apparatus is further configured to generate third position information by calculating the average value of the first position information and the second position information or generate third position information according to the occurrence probability of the first position information and the second position information.

26. The system according to claim 25, further comprising a first cell position information requesting apparatus, wherein
   the first cell position information requesting apparatus is configured to send the location service apparatus a locating request including an identifier of a first cell to be searched; and the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

27. The system according to claim 24, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

28. The system according to claim 23, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

29. The system according to claim 22, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

30. The system according to claim 21, further comprising:
a second terminal, which is configured in the cell where the first terminal resides and configured to receive a second locating request sent by the location service apparatus, carry out a location according to the second locating request, and send the generated second position information to the location service apparatus; and
the location service apparatus is further configured to generate third position information according to the first position information and the second position information, and update the position information of the cell with the third position information.

31. The system according to claim 30, wherein
the location service apparatus is further configured to calculate, after receiving the first position information from the first terminal, GPS assistance information according to the first position information and include the calculated GPS assistance information in the second locating request to be sent to the second terminal; and
the second terminal is further configured to carry out a GPS location according to the GPS assistance information.

32. The system according to claim 31, wherein
the first position information and the second position information are latitude and longitude coordinates; and
the location service apparatus is further configured to generate third position information by calculating the average value of the first position information and the second position information or generate third position information according to the occurrence probability of the first position information and the second position information.

33. The system according to claim 32, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

34. The system according to claim 31, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

35. The system according to claim 30, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

36. The system according to claim 21, further comprising a first cell position information requesting apparatus, wherein
the first cell position information requesting apparatus is configured to send the location service apparatus a locating request including an identifier of a first cell to be searched; and
the location service apparatus is further configured to compare the identifier of the first cell to be searched with that of the cell where the first terminal resides, and send the cell position information to the first cell position information requesting apparatus when the result of the comparing shows that the identifiers of the first cell to be searched and the cell where the first terminal resides are the same, so as to acquire the position information of the cell to be searched.

* * * * *